United States Patent
Basir

(10) Patent No.: US 9,135,624 B2
(45) Date of Patent: Sep. 15, 2015

(54) USER-CENTRIC TRAFFIC ENQUIRY AND ALERT SYSTEM

(75) Inventor: Otman Adam Basir, Waterloo (CA)

(73) Assignee: INTELLIGENT MECHATRONIC SYSTEMS INC., Waterloo, Ontario (CA)

(*) Notice: Subject to any disclaimer, the term of this patent is extended or adjusted under 35 U.S.C. 154(b) by 365 days.

(21) Appl. No.: 13/244,204

(22) Filed: Sep. 23, 2011

(65) Prior Publication Data

US 2012/0075118 A1 Mar. 29, 2012

Related U.S. Application Data

(60) Provisional application No. 61/385,583, filed on Sep. 23, 2010.

(51) Int. Cl.
| | |
|---|---|
| G06Q 20/40 | (2012.01) |
| G08G 1/0967 | (2006.01) |
| G06G 1/00 | (2006.01) |
| G06Q 20/06 | (2012.01) |

(52) U.S. Cl.
CPC .......... G06Q 20/4016 (2013.01); G06Q 20/06 (2013.01); G08G 1/096741 (2013.01); G08G 1/096775 (2013.01)

(58) Field of Classification Search
USPC .................. 340/905, 988; 701/32.5
See application file for complete search history.

(56) References Cited

U.S. PATENT DOCUMENTS

| | | | |
|---|---|---|---|
| 4,591,823 A | 5/1986 | Horvat | |
| 5,177,685 A | 1/1993 | Davis et al. | |
| 5,182,555 A | 1/1993 | Sumner | |
| 5,654,908 A | 8/1997 | Yokoyama | |
| 5,889,477 A * | 3/1999 | Fastenrath | 340/905 |
| 6,456,936 B1 | 9/2002 | Neukirchen et al. | |
| 6,542,818 B1 | 4/2003 | Oesterling | |
| 6,615,130 B2 | 9/2003 | Myr | |
| 6,650,948 B1 | 11/2003 | Atkinson et al. | |
| 6,879,836 B2 * | 4/2005 | Nakamoto et al. | 455/456.2 |
| 7,233,861 B2 * | 6/2007 | Van Buer et al. | 701/424 |
| 7,430,472 B2 * | 9/2008 | Zhao et al. | 701/516 |
| 7,609,172 B2 * | 10/2009 | Rozum et al. | 340/901 |
| 7,831,384 B2 * | 11/2010 | Bill | 701/423 |
| 8,207,866 B2 | 6/2012 | Hatami | |
| 2002/0156573 A1 * | 10/2002 | Stefan et al. | 701/211 |
| 2004/0038671 A1 | 2/2004 | Trayford et al. | |
| 2004/0225437 A1 | 11/2004 | Endo et al. | |
| 2005/0099321 A1 | 5/2005 | Pearce | |
| 2005/0107944 A1 | 5/2005 | Hovestadt et al. | |
| 2006/0055565 A1 | 3/2006 | Kawamata et al. | |
| 2007/0038360 A1 | 2/2007 | Sakhpara | |
| 2008/0051971 A1 | 2/2008 | Sung | |

(Continued)

FOREIGN PATENT DOCUMENTS

| | | |
|---|---|---|
| DE | 10134108 A1 | 1/2003 |
| DE | 102007062958 A1 | 6/2009 |

(Continued)

*Primary Examiner* — Jennifer Mehmood
*Assistant Examiner* — Omar Casillashernandez
(74) *Attorney, Agent, or Firm* — Carlson, Gaskey & Olds, PC

(57) ABSTRACT

A method for notifying a user about traffic including the step of determining an origin of the user. A destination of the user is also determined. Traffic conditions between the origin and the destination are determined. The user is notified of the traffic conditions.

11 Claims, 2 Drawing Sheets

(56) References Cited

U.S. PATENT DOCUMENTS

| | | |
|---|---|---|
| 2008/0071465 A1 | 3/2008 | Chapman et al. |
| 2008/0081641 A1 | 4/2008 | Smith et al. |
| 2008/0252487 A1 | 10/2008 | McClellan et al. |
| 2008/0270015 A1 | 10/2008 | Ishikawa et al. |
| 2009/0036148 A1* | 2/2009 | Yach ............... 455/457 |
| 2009/0105933 A1 | 4/2009 | Wlotzka |
| 2009/0140883 A1 | 6/2009 | Rani et al. |
| 2009/0164110 A1* | 6/2009 | Basir ............... 701/117 |
| 2009/0318119 A1 | 12/2009 | Basir et al. |
| 2010/0023246 A1 | 1/2010 | Zhao et al. |
| 2010/0036595 A1 | 2/2010 | Coy et al. |
| 2010/0094532 A1 | 4/2010 | Vorona |
| 2010/0100307 A1 | 4/2010 | Kim |
| 2010/0106411 A1 | 4/2010 | Nirhamo et al. |
| 2010/0138140 A1 | 6/2010 | Okuyama |
| 2010/0211301 A1 | 8/2010 | McClellan |
| 2012/0083995 A1 | 4/2012 | Vorona |
| 2012/0289253 A1 | 11/2012 | Haag et al. |
| 2013/0124074 A1 | 5/2013 | Horvitz et al. |
| 2013/0289860 A1 | 10/2013 | Finnis et al. |
| 2013/0289862 A1 | 10/2013 | Chapman et al. |
| 2014/0025281 A1 | 1/2014 | Zhao et al. |

FOREIGN PATENT DOCUMENTS

| | | |
|---|---|---|
| EP | 1986170 A2 | 10/2008 |
| WO | 2009080073 A1 | 7/2009 |

* cited by examiner

USER-CENTRIC TRAFFIC ENQUIRY AND ALERT SYSTEM

This application claims priority to U.S. Provisional Application Ser. No. 61/385,583, filed Sep. 23, 2010.

BACKGROUND OF THE INVENTION

This application relates to trip time computation, and more specifically to a system for computing trip time that includes traffic profiling and road condition-based computation with localized and cooperative assessment.

Previous traffic determination systems have estimated traffic using triangulated positioning of cell phones to determine a speed at which a cell phone moves. There are many limitations and drawbacks in the current systems. For example, if a phone moves quite slowly, it may be assumed that a driver carrying the phone is driving in traffic.

SUMMARY OF THE INVENTION

A method for notifying a user about traffic including the step of determining an origin of the user. A destination of the user is also determined. Traffic conditions between the origin and the destination are determined. The user is notified of the traffic conditions. Many ways of determining a destination of the user are disclosed. Several optional ways for a user to customize traffic alerts are disclosed.

In another, optional feature, the destination is determined by monitoring a history of destinations by the user and predicting the destination based upon the history of destinations. This can be done by monitoring destinations on days of the week and times of day.

The traffic conditions may be compared to a threshold set by the user and wherein said step d) includes only notifying the user based upon the comparison with the threshold. The threshold may be a length of delay of calculated travel time relative to expected travel time under normal conditions.

In another, optional feature, the destination may be determined based upon an analysis of a set of contacts associated with the user. This may be done by comparing the user's current direction of travel to addresses in the contacts. Alternatively, or additionally, this may be done based upon a calendar event associated with the user.

In another, optional feature, the destination may be determined based upon at least one contact among a plurality of user contacts associated with the user.

In another, optional feature, the destination may be determined based upon a direction of travel of the user. The step of monitoring traffic conditions includes determining traffic conditions in the user's direction of travel.

The notification may be performed at a set time interval prior to the user leaving the origin. The notification may be performed at a time that is dependent upon the traffic conditions determined. The notification may be performed at a time that is based upon a latest time of arrival received from the user.

In another, optional feature, the destination may be determined based upon the user's current location and based upon a current direction of travel of the user.

In another, optional feature, the destination may be determined based upon a comparison of current location and current direction of travel to addresses in contacts associated with the user.

In one example embodiment, at least some of said steps are performed on a mobile device. At least some of said steps a)-d) are performed on a server remote from the user.

These and other features of the present invention can be best understood from the following specification and drawings, the following of which is a brief description.

DETAILED DESCRIPTION OF THE PREFERRED EMBODIMENT

Figure 1:
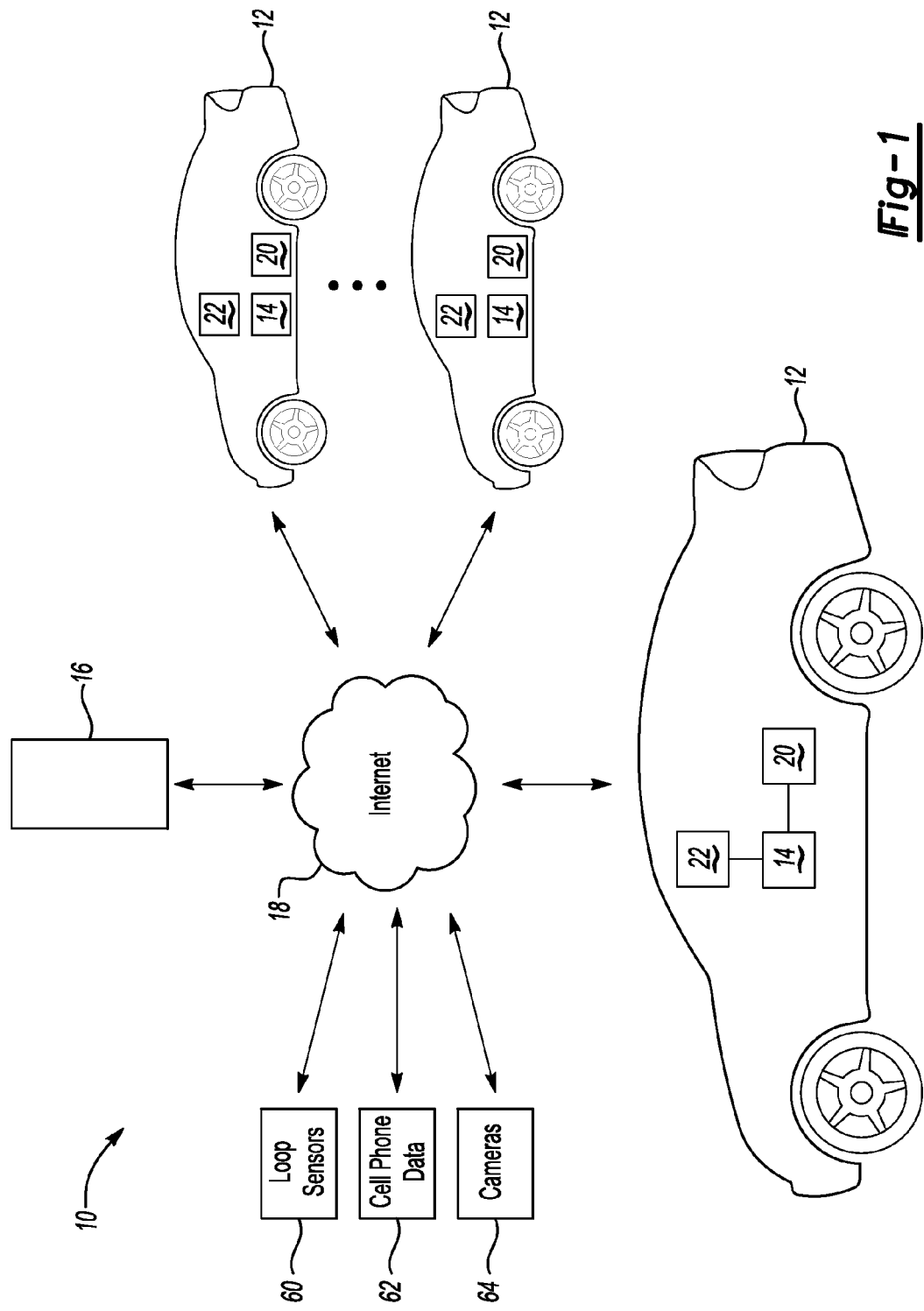
FIG. 1 schematically illustrates a traffic profiling system.

FIG. 1 schematically illustrates a traffic profiling system 10. A vehicle 12 includes an onboard traffic conditions computer 14 (hereinafter "onboard device"). In one example the onboard device 14 includes some or all of the features in the commercially available iLane® product (see http://www.ilane.ca/), also described in co-pending application U.S. Pat. App. 20090318119, filed Jun. 19, 2009, which is hereby incorporated by reference in its entirety. A server 16 is operable to communicate wirelessly with the onboard device 14 via a wide-area network, such as the Internet 18, or a private network or channel. Similar onboard devices 14 are installed on numerous vehicles 12 in the same geographic area and also communicate with the server 16. The server 16 may also receive traffic information from loop sensors 60, cell phone data 62, cameras 64 or other known sources of traffic information, which can be fused with information from the onboard devices 14.

Figure 2:
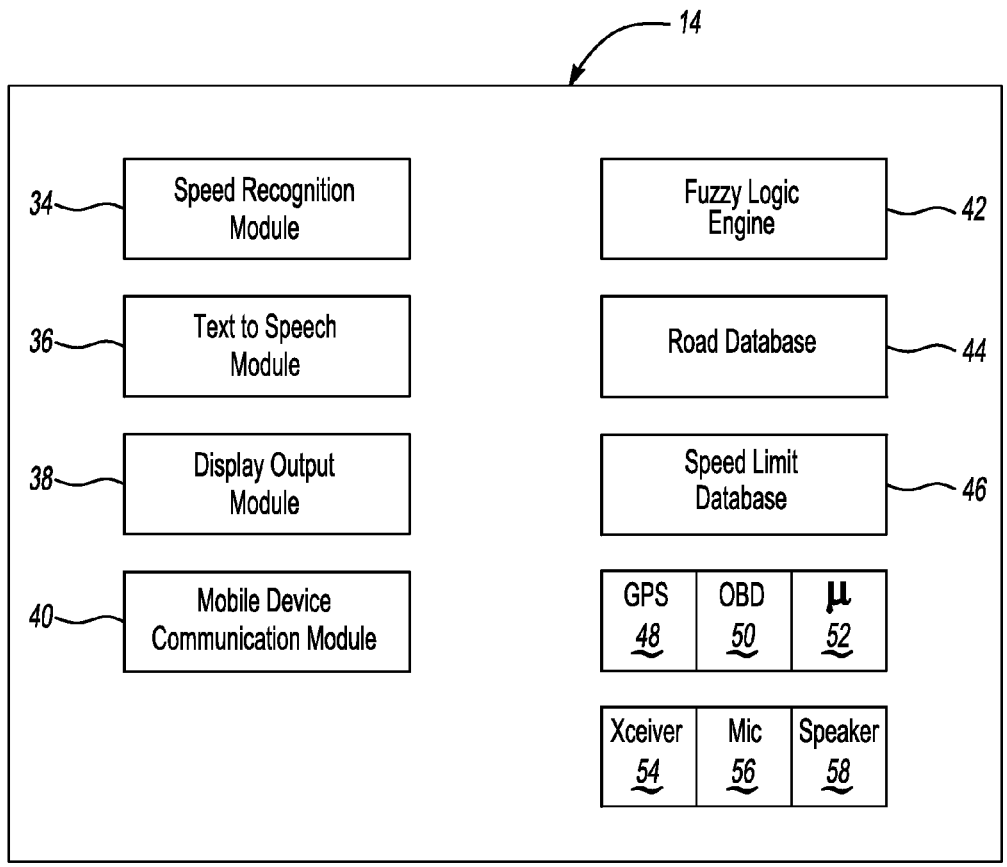
FIG. 2 schematically illustrates an onboard device for a vehicle in the system of FIG. 1.

The onboard device 14 is schematically illustrated in greater detail in FIG. 2. The onboard device 14 includes a road database 44 and a speed limit database 46 indicating speed limits on the road segments in the road database 44. The road database 44 and speed limit database 46 may be pre-stored on the onboard device 14 or downloaded and/or updated from the server 16. If the road database 44 and speed limit database 46 are downloaded and/or updated from the server 16, they may be downloaded and/or updated only for roads in the vicinity of the vehicle 12. The vicinity may be defined as an area around the vehicle 12 which is set to be dependent on density of roads and density of populations (e.g., the higher the density the smaller is the area).

The onboard device 14 includes a processor 52 and storage for storing the data and programs to perform the functions described herein. The onboard device 14 may include a GPS receiver 48, or may receive GPS location from a cell phone or other mobile device 22 (FIG. 1). The onboard device 14 includes an OBD port 50 for receiving on-board diagnostic information from an OBD port (or OBD-II or any other protocol) on the vehicle 12. A mobile device communication module 40 provides wireless (or alternatively, wired) communication with the mobile device 22 to provide communication to the server 16 and to obtain information from the mobile device 22 itself (contacts, email, GPS location information, etc). The onboard device 14 may also include one or more wireless transceivers 54 to communicate directly with cell towers to access the Internet 18 and/or with wireless transceivers 54 on other vehicles 12. The onboard device 14 further includes a microphone 56 for receiving voice commands from a user and a speaker 58 for giving audible information to the user. The speaker 58 could alternatively be part of the vehicle 12 audio system. The onboard device 14 preferably communicates with the user primarily via voice, although a display output module 38 for sending information to a display 20 could also be provided. Thus, the onboard device 14 includes a speech recognition module 34 and a text-to-speech module 36.

Although the vehicle 12 is illustrated as being an automobile, it is understood that the onboard device 14 could be applied to other vehicles too, such as motorcycles, bicycles, etc.

Since the onboard device 14 may be used by a vehicle operator (e.g. a driver), by a vehicle passenger (e.g. limousine passenger), or by another party, the term "user" will be used to refer to a person interacting with the onboard device 14.

Localized Assessment

Figure 3:
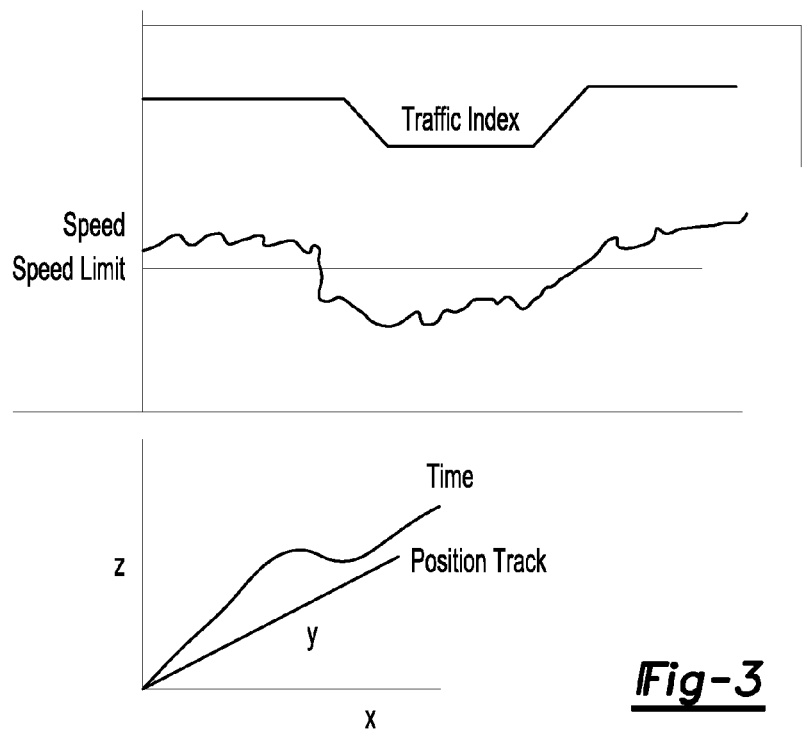
FIG. 3 schematically illustrates an example traffic index.

The system 10 determines its location relative to the database of roads 44 based upon (for example) the GPS location information and then obtains the current speed limit of the current road segment from the speed limit database 46. The onboard device 14 determines its current speed based upon information from the GPS receiver 48 and/or from the speed information available on the OBD 50 and/or from an accelerometer on the onboard device 14. The onboard device 14 compares the current speed limit with the current estimated speed of the vehicle 12, and computes a traffic condition index based on the comparison of speed with the speed limit, and indexed to position, as shown in FIG. 3. The index is one of a number of traffic condition classes (see, e.g., FIG. 3). If at the time the traffic index matches some traffic conditions criteria, a spatio-temporal profile of the traffic index is transmitted to the server 16. For example, if the index indicated the presence of traffic congestion, then a message is sent to the server 16 indicating a traffic congestion event along with the profile. The message includes the time, road segment, location and current speed.

Thus, the onboard device 14 is operable to perform a "localized assessment" on the vehicle 12 of traffic (e.g., comparing a speed limit to a current vehicle speed).

Cooperative Assessment

The onboard device 14 is responsive to voice commands via speech recognition module 34 (see FIG. 2). In one example, a user who recognizes a traffic congestion event can choose to send a traffic profile report alert to the server 16 by using a voice command to tell the onboard device 14 to send a traffic report alert to the server 16 in the form of a natural language sentence such as "very heavy road congestion," "congestion due to an accident," "congestion due to slippery conditions," etc. The onboard device 14 will send the sentence along with a time and a location of the vehicle 12.

In this example, the server 16 parses the sentences it receives to estimate the traffic condition in and around the reported location of the report. An algorithm at the server 16 is used to process the parsed sentences to compute a traffic conditions profile throughout the road network and to determine and eliminate outlier reports or incorrect reports. A similar algorithm may be used to process the traffic condition indices in the "Localized Assessment" section above.

Thus, the onboard device 14 is also operable to perform a "cooperative assessment" because there is some interaction or discourse between the onboard device 12 and the user to assess traffic conditions.

Merging of Traffic Data from Multiple Sources

Whenever possible, the server 16 may fuse the parsed sentences from many users for the area and reported indices from many vehicles 12 for the area to compute a reliable and explainable traffic condition for a traffic segment, leading to determination of the traffic conditions in the area. Furthermore, this information may be fused with traffic data obtained from other sources, such as loop sensors 60, cameras 64, and GSM-mobility data 62. Such diverse multi-source reports allow for high confidence and more accurate traffic conditions estimation. The server 6 may process parsed sentences (the cooperative assessments) and indices (the localized assessments) collected from multiple vehicles 12 to establish time and contextual statistical traffic record for an area, and to ensure accuracy of traffic data.

Road Condition Inquiries from Onboard Device

The onboard device 14 can send inquiries about road conditions on a certain road segment to the server 16. Based on the processed reported sentences and indices received from multiple vehicles 12, the server 16 can send the inquirer a response indicating the traffic condition of the area. Also, in this case other traffic profiling data from GPRS/GSM and loop sensors may be used to compose a report. If no report or index is available for the area then a message is sent to the onboard device 14 indicating such condition (e.g., a "no incident" or "no data available" response is sent to the onboard device 14). The onboard device 14 conveys the information to the operator of the vehicle 12 using voice (using Text to Speech module 36 in FIG. 2) or congestion color code road map on a display 20 (using Display Output module 38 in FIG. 2). Of course, other reporting methods would be possible. This information may also be reported on a web portal for viewing (e.g. on the display 20).

Selective Transmission of Traffic Alerts

The server 16 may receive traffic condition reports from many vehicles 12, and the server 16 continuously processes those reports to determine traffic alerts. Onboard devices 14 may be used to navigate the user via a calculated route to a destination, such that the current location and destination are easily known.

Alternatively, even without navigation, the destination of the vehicle 12 may otherwise be known or may be deduced (e.g. based upon driving patterns, such as driving home after work on weekdays). For example, first, the destination and even (if necessary) the current location can be scheduled or can be deduced.

A user can a user-friendly user interface (such as by accessing the server 16 via the internet 18) to define a path (or at least an origin and destination) on a map and time of day window of interest (e.g, 4:00 PM and 6:00 PM on weekdays), and trip time tolerance for the path, and Latest time of arrival (LTA). The user can also associate a contact (from mobile device 22) that is relevant to the path.

Alternatively, the server 16 (and/or onboard device 14 and/or mobile device 22) can deduce the user current path and destination based upon driving history. For example, if user tends to be in location A first in the day and in location B later in the day, the system will deduce based on the time window the start of the trip and the end of the trip, and hence can deduce relevant traffic flow. For example, if the user normally commutes from Toronto to Waterloo in the morning and back from Waterloo to Toronto later in the day, the system will report westbound traffic conditions in the morning and eastbound traffic conditions later in the day—depending on the time of day window. The user can always be more specific on a path entry so as to inform the system the start of the path and the end of the path, and as such the system can deduce the relevant traffic flow.

The server 16 determines the vehicles 12 that are affected by the alert (based upon their current locations and based upon the known or assumed destinations) and sends the alerts to those affected vehicles. Additionally, or alternatively, where the destination is not known, road segments in the area in the direction that the vehicle 12 is heading are considered relevant. For example, based on destination and location of vehicle 12, an alert may be sent to the vehicle 12. Vehicles not affected by the condition are not bothered and the server 16 may choose to not even send the report to those vehicles.

The system will insert this information from the user information in a stack that is time of day indexed. When the system day timer approaches the start of the time window the system computes a traffic condition report along the path that was introduced by the user. The system will use the current location (from user GPS unit or cell phone location) of the user to deduce traffic flow direction to be relevant to the user (e.g., east bound vs west bound). If the user location information is not available then the system may use historical information on user mobility to deduce user location based on the time.

The user can enter to the system a trip time tolerance value. The system will use this time tolerance to compute a threshold for the alert. For example, the user may indicate to the system that his/her trip time tolerance for the path is a certain length of time, e.g. 20 minutes. In this case the system will compute trip time for the path, and compares that to the trip time of the path under normal traffic conditions. If the computed trip time for the path is different from the trip time of the path under normal traffic conditions by more than 20 minutes, then the system will send an alert, otherwise no alert is sent. Alternatively, the time tolerance can be expressed in terms of a percent of normal travel time (e.g. send an alert if travel time will increase more than 10% over the normal travel time).

The user can enter the path information via the system web site or by composing a message (such as a properly formatted email, text message, etc) to the server 16. The system can parse the message to determine the relevant information, such as path start, path end, LTA, LTD, Contact, Tolerance, etc.

As an alternative, instead of generating alerts based upon a time frame, the alert session can be initiated as soon as it is determined that the car is on or approaching the path to the destination. Further, if the user does not enter a specific path, the system will deduce paths relevant to the user distinction, based on historical driving behavior of the user around the time frame of travel and or best paths possible.

A "path-relevant contact" could be home, office, friend, colleague, a meeting party, etc., that is a contact on the user's mobile device 22. The system can deduce a path-relevant contact from the user's calendar. If there exists a calendar event (e.g. on the mobile device 22) that coincides with the estimated time of arrival and/or a calendar event the location of which is in the vicinity of the user destination then all participants in the calendar event (meeting parties, or destination contact) may be sent an alert (e.g. if the user is going to be late) to all or some of the participants in the meeting or the contact person associated with the destination (for example, if the destination address matches a contact in the user's contacts).

The system acquires incident reports on the road network for example by connecting to a road management entity a government road management entity. The system matches reported incidents to the user paths of travel. Once an incident is detected it is continuously monitored to estimate severity and persistence of impact on trip time along the paths. The system will alert the user on the incident and provide linguistic description on the incident such as where, how long is the traffic jam due to the incident, and suggest alternative routing if possible.

The user informs the system (e.g. server 16 and/or mobile device 22) that the user intends to go to a destination and would like to be at destination by a certain time. The system can also deduce this information from monitoring the user's travel trends and history. For example, the system observes that the user makes daily trips to arrive at destination around 7 PM. The agent uses 7 PM as a target arrival time and plans the trip in terms of best path and trip starting time so that the user will arrive at the destination at 7 PM. The system uses real-time path planning system to propose trip starting time based on its knowledge of the traffic conditions. This knowledge is derived from historical data, current traffic conditions, and information provided by other agents. The user can use attributes such as (critical arrival time, flexible arrival time, and not-before arrival time, etc) to describe his planned arrival time at the destination. This information is used by the system to perform multi-criteria optimization calculation to balance distance traveled, time traveled, and total idle time.

Trip Time Computation

If a vehicle 12 operated has programmed with a destination into the onboard device 14 or the server 16, then the trip time to the destination may be computed based on routing data and traffic conditions on the route. The onboard unit 14 or the server 16 determine a sequence of road segments, which can be computed onboard or can be obtained from a generic routing service provider such as MapQuest. The onboard unit 14 or the server 16 then checks if a road segment is affected by a congestion situation. If a segment is determined to be affected by a traffic congestion event, the travel time for the segment may be recomputed and the trip time to destination may be updated, and the user may be informed of the updated trip time (e.g. via Text to Speech module 36). Alternatively, if a segment on the route is determined to be affected by a traffic congestion event, then the route can be recalculated to avoid the congested segment.

Timed Event Functionality

If the user programs a timed event (e.g. such as a meeting, can be fetched from calendar on mobile device 22), the onboard device 14 may provide a proper warning on the possibility of missing the meeting (e.g. providing a computer generated speech message to the user). The onboard device 14 may offer to call the meeting inviter to allow the user to notify the meeting inviter of a possible delay, or may offer to transmit an email message or a text message to the user to provide the notification. The call, email, or text message may be performed using a mobile device 22 that the onboard device 14 communicates with via Mobile Device Communication module 40.

The onboard device 14 may suggest to the user a superior route to the destination that would exhibit less traffic. Thus, the onboard device 14 may perform a less traffic congestion routing feature.

If the user enters a meeting location and time in his mobile device 22 or office computer calendar, the system 10 will continue to monitor traffic conditions that affect the roads between the user's current location and that where the meeting will take place. If the onboard device 14 or server 16 determine that a difference between the present time and that when the meeting will take place is becoming critically tight for the user to travel to the meeting place, a warning may be sent to the user on his computer or mobile phone 22 to warn him/her that timing is getting tight for them to make it to the meeting. The user can add some safety factors in the form of extra time (e.g., if it takes 2 hours to travel to the meeting place, and the difference between the present time and the meeting starting time is 2 hours, the user may ask the system to allow for 30 minutes extra, and the system 10 may provide the warning 30 minutes before the present time).

The system uses the LTA and computed traffic conditions to determine the latest time of departure (LTD) for the user. The user is sent an alert x minutes before the LTD to inform the user that he/she need to leave in x minutes to make it to the destination on time (LTA). If during travel time on the path the system determines that LTA is unachievable a revised ETA (estimated time of arrival) is computed and the user is informed of the revised ETA. The system will offer to connect the user to the path relevant contact so that the user can inform them of travel delay. Alternatively, the system can send an alert to the path relevant contact to inform them of a delay the user is experiencing due to traffic conditions and the revised ETA. Optionally, the system will mark the current location of the user on a map and present the map to the path relevant contact.

Information Sharing

In addition to uploading a traffic profile report to the server 16, the system 10 may use short range communication capabilities of the transceiver 54 of the onboard device 14 to broadcast to vehicles in its vicinity the presence of traffic congestion. Thus, in one example, traffic information may be shared directly between onboard devices 14 in vehicles within a predefined proximity to each other. Alternatively, the information could be transmitted via the Internet or even via the server 16 (although, without filtering or fusion with other sources) between other onboard devices 14 within a radius of one another.

Information Weighting

Since the server 16 receives information about traffic from multiple vehicles 12 and other sensors 60, 62, 64, the server 16 may assign weights of evidence to the different sources and combine the information from the different sources and assign a weight of evidence (or confidence factor) on the traffic condition.

Abstraction of Traffic Conditions

In one example, the system 10 employs multi-level abstraction of traffic conditions of a road segment that ranges from numerical traffic data such as speed (e.g., "Current speed on road segment is 70 km/hour") to linguistic natural language traffic descriptors (e.g., "Traffic condition on the road segment is very slow"). A Fuzzy Logic Engine 42 (see FIG. 2) may be used to produce linguistic traffic descriptors from speed range measurements.

The Fuzzy Engine 42 allows the user to discourse with the onboard device 14 inquire about the traffic conditions. For example, the user can ask questions such as traffic conditions on current road on which the vehicle is being driven. The system 10 will scan the road and report using natural language traffic conditions at high level (e.g. "traffic is slow," or "somehow slow," or "very slow," or "smooth on a road segment"). The user can ask questions to the onboard device 14 (e.g., "Tell me traffic conditions on east bound," "Tell me traffic conditions on north bound," etc.). The onboard device 14 can take the name of a road uttered via voice by the user to a segment on the road or the whole road. For example, the system can determine based on vehicle location the interpretation of east bound relative to the vehicle location. That is, the system 10 can use the location and/or direction of vehicle 12 movement to determine relevant segment of the road that the user is interested in. The user can ask the system to provide more detailed information (e.g. by asking "How slow?"). Where the system 10 provides a current speed range on the segment (e.g., "Traffic is moving with speed between 40 to 50 km an hour"), the user can ask a question in response (e.g. "How bad is traffic on the segment?). The system 10 can answer with a speed range and possible a duration for which that speed range has been experienced by other users. The system can also say speed is starting to pick up. The user can set an alert flag, such that the system 10 will monitor traffic on the trip path and report emerging deteriorating/improving traffic conditions.

Based on the computed traffic assessment for a given user, the system composes a sequence of report to the user.

If the system determines that the traffic conditions are normal then a "normal condition" alert is sent to the user. No more alerts are sent until the traffic condition state has changed. The amount of change to trigger a report subsequent to the first "normal condition" is computed based on the persisting nature traffic flow variation. For example a traffic flow change in a small 100 meters segment on the road is ignored unless it persists in way such that its extends on the path to cover more 500 meters. Only then the system will send an alert to the user to inform him/her that traffic starts to worsen on his/her entered path. The system will use street/road names and land marks to localize the traffic alert to the user. For example, the system will send an alert such as "very slow traffic on HW 401, between Exit x and Exit y". It can also say "very slow traffic on King street just after Fairway Shopping Mall, Or exit into to Fairway shopping mall".

The system uses a fuzzy engine to translate traffic conditions data to linguistic traffic conditions indicators. Furthermore, the system uses an Artificial Neural Network to map current and historical traffic patterns to predicted traffic conditions along the path. These predictions can be used by the system to be more proactive in its alert announcement and traffic condition persistence profiling which is used to compute an alert threshold.

Multi-Agent Software Architecture

A multi-agent software architecture may be used to implement the system where by each user is assigned a software agent, such as in the mobile device 22 (alternatively, on the onboard device 14 or even on the server 16). The agent is the one that monitors on behalf of the user the traffic conditions that could potentially affect his/her trip time. The agent also performs the alert regime above. Furthermore, user can choose to enlist in a group of commuters, for example, daily Toronto-Waterloo commuters, weekly Waterloo-Toronto commuters, etc. The agents assigned to these users cooperate to exchange information about traffic and incidents. An agent that discovers a traffic incident such as an accident or congestion will broadcast information about the incident to agents in the group according to the rules set by the user to the broadcasting agent (e.g., inform agents within a certain range of the incident, agents of commuters who are approaching the incident, agents of commuters who happen to be in a certain geographical area, and/or agent who have reported travel paths that are affected by the incident). The recipient agent uses a set of rules personalized by the user to decide whether to inform its user or not (e.g. only if a certain number of agents reported the incident, only if its user is in the car, only if its user enabled the agent-to-agent traffic information exchange.) In this manner, the system could be run solely on the mobile devices 22, with little or no collection or analysis of data by the server 16.

User agents fuse information to compute statistical information on travel time for traveled paths. These statistics include, but not limited to, max travel time, min travel time, average travel time, probability of max time, probability of min travel time, variance. Agents are given weights based on how many paths they have processed. An agent that has monitored a road segment or travel path more frequently is given more weigh in the calculation that an agent who monitored the road segment or travel path less frequent.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method for notifying a user about traffic including the steps of:
   a) determining a current location of the user with a gps receiver;
   b) determining a destination of the user by comparing with a processor the user's current direction of travel from the user's current location to addresses in a set of electronically-stored contacts associated with the user;
   c) determining traffic conditions between the origin and the destination; and
   d) notifying the user of the traffic conditions based upon said step c).

2. The method of claim 1 wherein said step b) is performed by monitoring a history of destinations by the user and predicting the destination based upon the history of destinations.

3. The method of claim 2 wherein the step of monitoring the history of destinations by user includes monitoring destinations on days of the week and times of day.

4. The method of claim 3 further including the step of comparing the traffic conditions to a threshold set by the user and wherein said step d) includes only notifying the user based upon the comparison with the threshold.

5. The method of claim 4 wherein the threshold is a length of delay of calculated travel time relative to expected travel time under normal conditions.

6. The method of claim 1 wherein said step b) is performed based upon a calendar event associated with the user.

7. The method of claim 1 wherein said step d) is performed at a set time interval prior to the user leaving the origin.

8. The method of claim 1 wherein said step d) is performed at a time that is dependent upon the traffic conditions determined in said step c).

9. The method of claim 1 wherein said step d) is performed at a time that is based upon a latest time of arrival received from the user.

10. The method of claim 1 wherein at least some of said steps a)-d) are performed on a mobile device.

11. The method of claim 1 wherein at least some of said steps a)-d) are performed on a server remote from the user.

* * * * *